Dec. 29, 1959 J. A. KOZEL 2,918,937
ACTUATING VALVE
Filed Nov. 22, 1955 4 Sheets-Sheet 1

Inventor
JAMES A. KOZEL

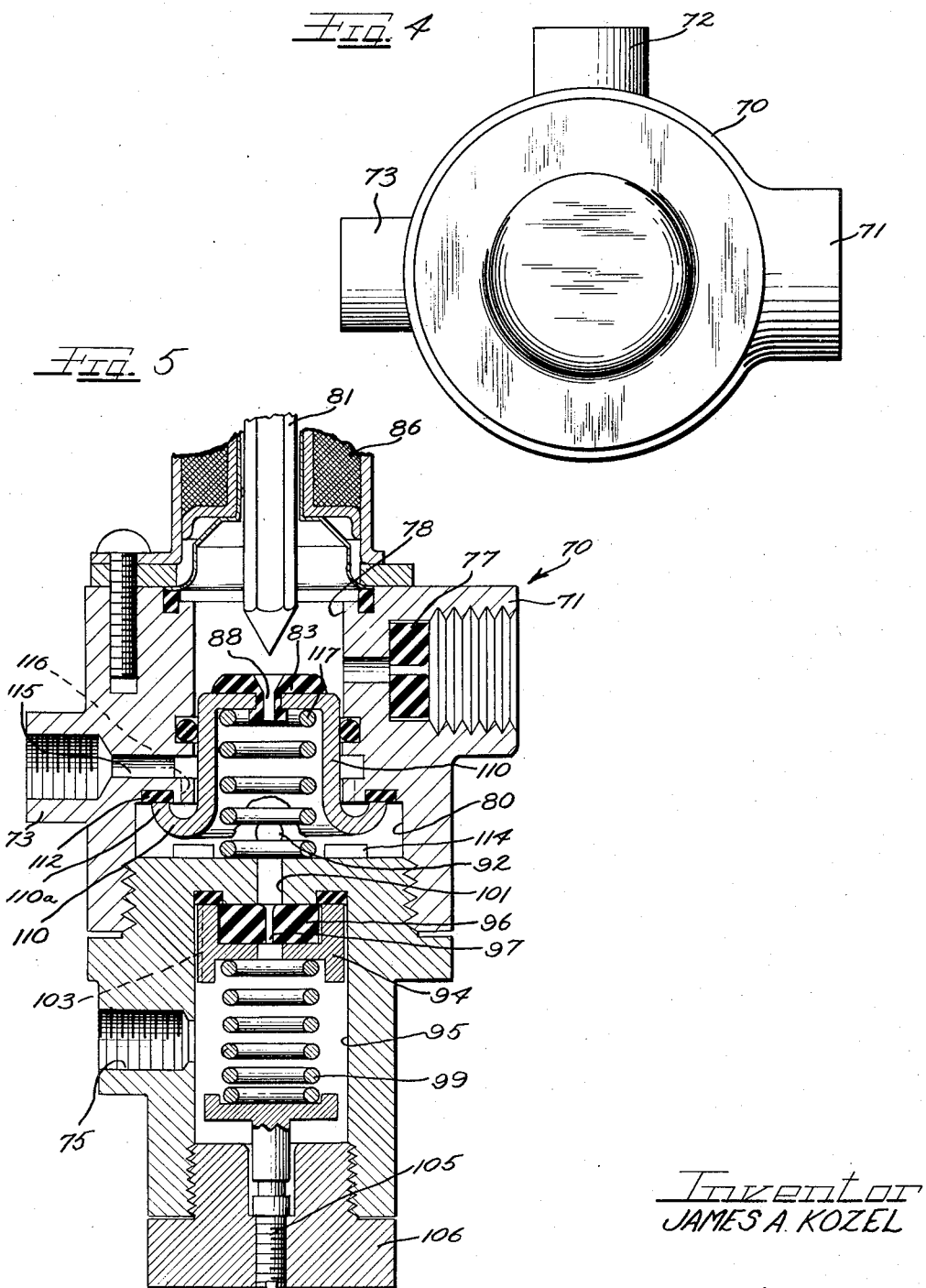

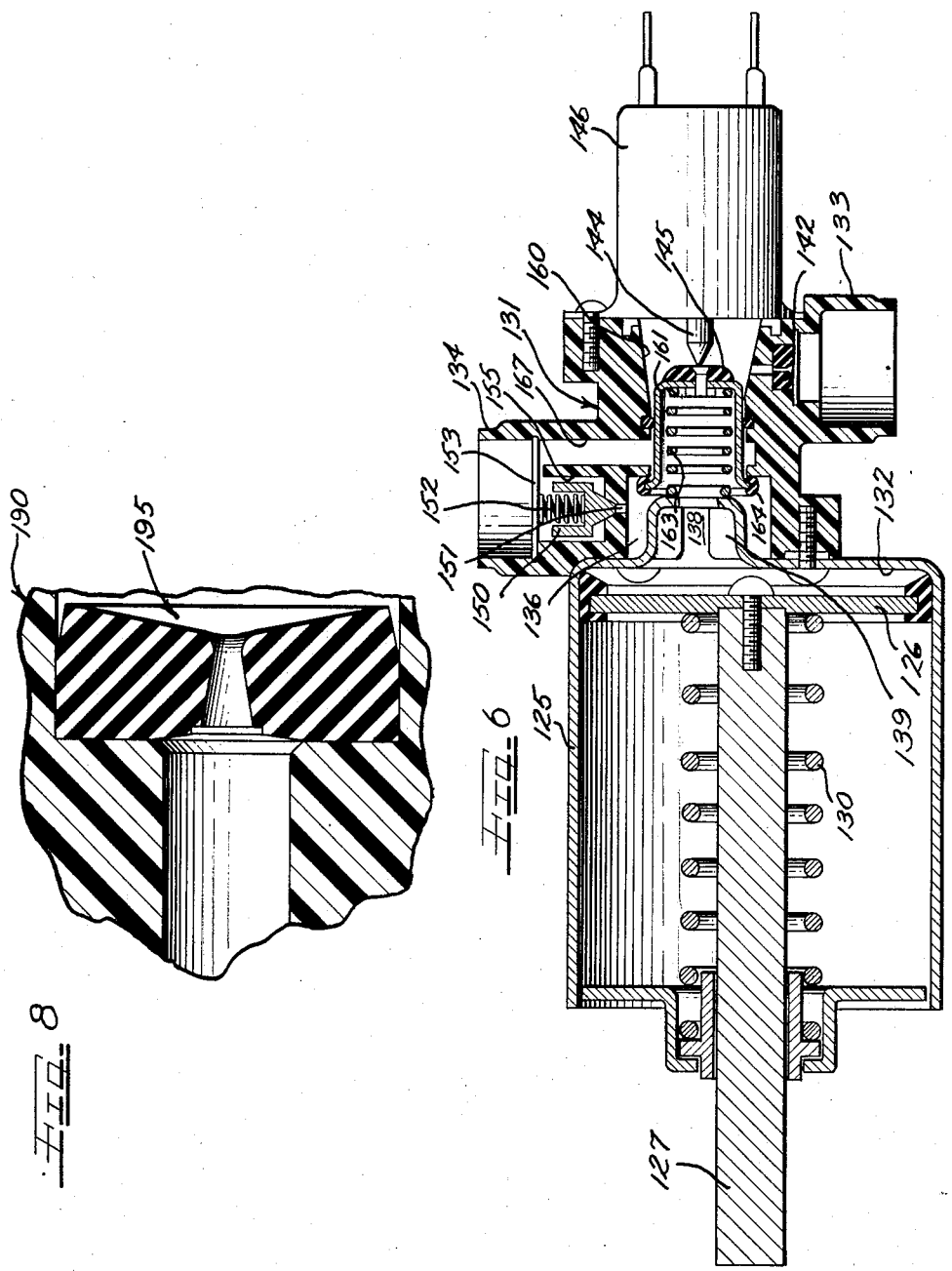

Dec. 29, 1959  J. A. KOZEL  2,918,937
ACTUATING VALVE
Filed Nov. 22, 1955  4 Sheets-Sheet 4

Inventor
JAMES A. KOZEL
By Hill, Sherman, Meroni, Gross & Simpson
Attys

United States Patent Office 2,918,937
Patented Dec. 29, 1959

2,918,937

ACTUATING VALVE

James A. Kozel, Chicago, Ill., assignor to The Dole Valve Company, Chicago, Ill., a corporation of Illinois Application November 22, 1955, Serial No. 548,451

10 Claims. (Cl. 137—620)

This invention relates to a flow control valve, and to an actuating assembly utilizing a flow control valve to regulate the operation thereof.

The valve of the present invention may advantageously be adapted to the control of a fluid pressure actuated device such as a piston and cylinder assembly. By way of specific example, a valve according to the present invention may impart a gradual shifting movement to an actuating piston for gradually engaging a pulley with a driving belt in an automatic washing machine in such a manner as to avoid overload of the motor. After engagement of the pulley with the driving belt, a predetermined maximum pressure is provided for holding the pulley and belt in engagement during a given work cycle. At the end of the cycle, the valve is operative to afford a rapid exhausting of fluid from the cylinder.

It is therefore an important object of the present invention to provide a novel and improved valve assembly.

It is another object of the present invention to provide a valve assembly for controlling the application of fluid pressure wherein when the pressure supplied by the valve reaches a predetermined value, the valve is automatically operative to maintain the pressure at said value.

It is still another object of the present invention to provide a valve for supplying a gradually increasing pressure up to a predetermined limiting pressure, after which said predetermined pressure is maintained, and wherein the pressure may be rapidly dropped by means of a remote control.

In accordance with a feature of the present invention there is provided a valve for applying pressure to a system wherein supply of pressure is cut-off and the system exhausted by means of a single actuation of the valve.

In accordance with a further feature of the present invention, there is provided a valve for controlling the supply of pressure to a system wherein when the flow of pressure through the device is shut off, the inlet pressure assists in actuating the mechanism to exhaust pressure from the system.

In accordance with still another feature of the present invention there is provided a valve having a chamber maintained at a predetermined pressure in one condition of the valve and having means for exhausting the chamber in another condition of the valve.

It is yet another object of the present invention to provide a solenoid operated valve wherein actuation of the solenoid is operative simultaneously to shut off supply of fluid to a chamber in the valve and to exhaust fluid from said chamber.

Still another and further object of the present invention is to provide a novel solenoid operated valve mechanism especially adapted for controlling a hydraulic actuator.

Yet another and further object of the present invention is to provide a novel fluid operated actuating assembly.

A more specific object of the present invention resides in providing a fine degree of control of the rate of increase of pressure in a chamber of a valve assembly.

A further specific object of the present invention resides in the provision of a valve having a pressure chamber for developing a predetermined maximum pressure, wherein means is provided for conveniently adjusting such maximum pressure.

Other and further important objects, features and advantages of the present invention will be more fully apparent from the following detailed description taken in connection with the accompanying drawings, in which:

Figure 4 is a plan view of a modified valve assembly in accordance with the present invention;

Figure 5 is a fragmentary vertical sectional view of the valve of Figure 4;

Figure 6 is a longitudinal sectional view of a fluid operated actuating assembly in accordance with the present invention;

Figure 8 is a fragmentary enlarged longitudinal sectional view illustrating the constant flow washer of Figure 7.

As shown on the drawings:

Figure 1:
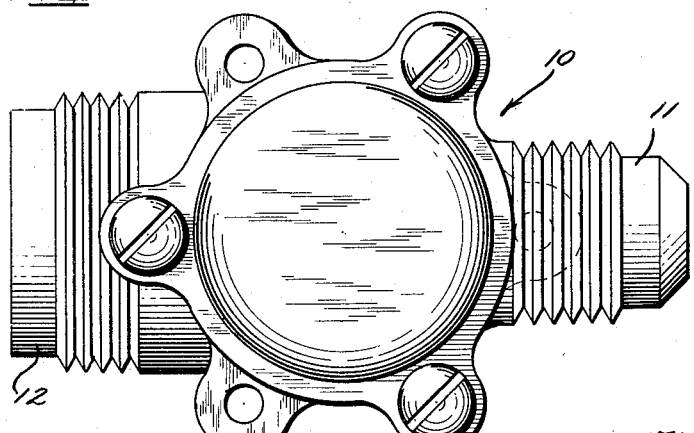
Figure 1 is a top plan view of a valve assembly in accordance with the present invention.
Figure 2:
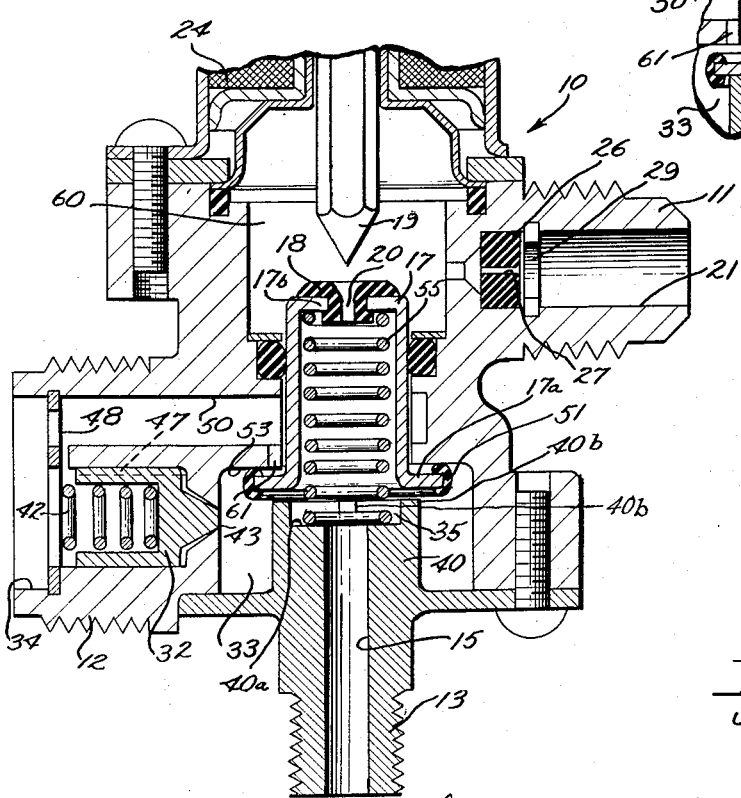
Figure 2 is a fragmentary vertical sectional view of the valve of Figure 1.

Referring to Figures 1 and 2, there is illustrated a pressure regulating valve assembly 10 in accordance with the present invention having an inlet fitting 11, a discharge or exhaust fitting 12 and an outlet fitting 13. Merely by way of example of a system in which the valve 10 may be utilized, the inlet fitting 11 may be connected to the high pressure side of a suitable pump, or other source of pressure, the exhaust fitting 12 may be connected to a suitable drain or sump, and the outlet fitting 13 may be connected with a suitable fluid pressure actuated device such as a cylinder and piston, bellows or diaphragm assembly for translating a pressure developed in the outlet passage 15 into a mechanical movement or the like. By way of example, it may be desired to supply pressure to a fluid actuated output device in a gradual manner up to a predetermined maximum pressure, and then to maintain said maximum pressure until it is desired to deactuate the output device. As an example of such an application, it may be desired in an automatic washing machine to gradually shift an actuating piston to gradually engage a pulley with a driving belt so as to avoid overloading the motor. After engagement of the pulley with the driving belt, it may be desired to maintain a constant predetermined force holding the pulley and belt in engagement during a particular cycle of operation of the washing machine, after which it may be desired to rapidly disengage the pulley and driving belt.

Figure 3:
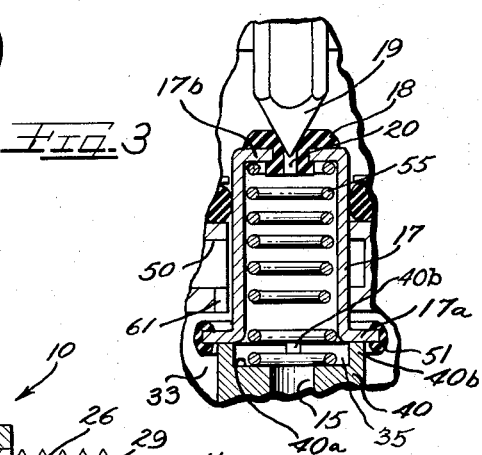
Figure 3 is a fragmentary view of a portion of the valve of Figure 2 and illustrating the valve in its shut off position.

For normally shutting off the supply of fluid to the outlet passage 15, the valve 10 may include a first valve member 17 having a valve seat member 18 for control by a second valve member 19. As indicated in Figure 3, the valve member 19 is movable into closing relation to the valve seat member 18 to close the passage 20 leading through the valve seat member 18 and providing communication between inlet passage 21 of inlet fitting 11 and outlet passage 15 of outlet fitting 13. By way of example, the valve member 19 may be made of a magnetic material and may be spring urged into seating relation illustrated in Figure 3. A solenoid 24 may be operative to retract the valve member 19 to the position illustrated in Figure 2.

For controlling the rate of flow into the valve to control the rate of increase of pressure in the outlet passage 15, a flow control washer 26 is provided in the inlet passage 21 and has a deformable flow restricting passage 27 for maintaining a substantially constant flow from inlet passage 21 into the interior of the valve. The flow control device 26 may be removably retained in the passage 21 by means of a split retainer ring member 29.

For limiting the maximum pressure which may be developed in the discharge passage 15, a pressure regulating device 32 is provided in the exhaust fitting 12 controlling communication between a pressure chamber 33 and the discharge passage 34. The chamber 33 communicates with the outlet passage 15 through the space between valve member 17 and a central boss portion 40 which extends into the pressure chamber 33 and defines a portion of the discharge passage 15. The pressure control device 32 is urged by means of a spring 42 into closing relation to an exhaust orifice 43. The control device 32 is splined to provide longitudinal passages such as 47 in Figure 2 extending from the orifice 43 to the exhaust passage 34. A retainer ring 48 serves to afford a bottom for the spring 42 to retain the device 32 in operative relation to the orifice 43 and to afford easy replacement thereof if a different maximum pressure in the chamber 33 is desired. In actuated condition of the valve as illustrated in Figure 2, an exhaust passage 50 is sealed off from the pressure chamber 33 by means of a valve ring 51 carried on a flange 17a of valve member 17 and cooperating with a seat 53 provided by the valve housing. A compression spring 55 extends within the valve member 17 and is seated at one end on a shoulder 40a of boss 40 and bears against an inturned flange 17b at the upper end of the valve member 17.

When the solenoid 24 is deenergized, a compression spring acting on the upper end of the armature 19 forces the same downwardly into seating relation to the valve seat member 18. The pressure exerted by this compression spring on the upper end of the armature 19 may not be sufficient to overcome the opposing force of spring 55; however, upon closure of passage 20, pressure tends to build up in the inlet chamber 60 and is exerted on the upper end of the valve member 17 to force the valve member downwardly against lugs 40b of boss 40 to move the valve ring 51 to open position as illustrated in Figure 3. Pressure is then relieved from the pressure chamber 33 through passages such as 61 to the exhaust passage 50. Fluid in the pressure actuated device connected with the outlet 13 is now relieved through the passage 15, spaces 35 between lugs 40b, pressure chamber 33, passages 61, and exhaust passage 50.

*Summary of the operation of the embodiment of Figures 1 to 3*

When the solenoid 24 is energized, the valve member 19 is retracted to the position shown in Figure 2 allowing spring 55 to return the valve member 17 to its upper position as shown in Figure 2 with valve ring 51 in seating relation to valve seat 53. Flow is now supplied to the output device through the outlet passage 15 under the control of the flow metering washer 26. If the output device has characteristics such that the progressive supply of fluid thereto meets with increasing resistance, a point will be reached where the pressure in the pressure chamber 33 exceeds the bias of spring 42, and pressure will be maintained at the predetermined value through the action of the regulating device 32. Under these circumstances, no further fluid would be supplied to the output device, and the output device would be maintained in a predetermined condition as long as the valve member 17 remains in raised position.

If now, solenoid 24 is deenergized, a spring acting on valve member 19 is operative to return the valve member 19 to seating relation to the seat member 18 whereupon pressure builds up in the inlet chamber 60 to force the valve member 17 to lower position unseating valve ring 51. With valve ring 51 unseated as shown in Figure 3, fluid from the output device will normally flow into the passage 15, through the spaces 35 into the pressure chamber 33 and out through ports 61 to exhaust passage 50.

Referring now to the modified valve assembly of Figures 4 and 5, there is disclosed a valve housing 70 having an inlet 71, an outlet 72, a pressure chamber exhaust fitting 73 and an excess flow discharge fitting 75.

As in the previous embodiment, a deformable flow control washer 77 may be provided for maintaining a substantially constant rate of flow to an inlet chamber. The flow from the inlet chamber 78 to pressure chamber 80 is controlled by means of an armature and valve member 81 of magnetic material which cooperates with a valve seat member 83 carried by a valve member 110. In energized condition of the solenoid 86, the armature 81 is retracted to open passage 88 which leads through valve seat member 83 to the pressure chamber 80. Fluid flows from the pressure chamber 80 through the outlet passage 92 of outlet fitting 72 to the fluid pressure responsive output device with which the valve may be associated. Pressure in the pressure chamber 80 is controlled by means of a regulating valve 94 reciprocably mounted in an excess flow chamber 95. The regulating valve carries a flow control washer 96 having a central deformable passage 97 providing uniform flow from the pressure chamber 80 to the excess flow chamber 95. It will be understood that the flow to the outlet passage 92 is effectively the difference between the flow through washer 77 and through washer 96, so that by selecting the size of the orifice 97 in the flow control washer 96, the effective rate of flow through the outlet passage 92 may be adjusted. When the pressure in the pressure chamber 80 exceeds a predetermined value, compression spring 99 allows unseating of the valve assembly 94 so that fluid may flow through the passage 101 and around the regulating valve 94 to the excess flow chamber 95. Suitable splines may be provided in the regulating valve 94 to provide passages such as indicated at 103 extending longitudinally of the regulating valve 94.

For adjusting the maximum pressure limit in the pressure chamber 80, a threaded adjustment member 105 is threadedly engaged in a plug 106 at the lower end of the valve housing 70 and is longitudinally adjustable therein to adjust the closing force exerted on the regulating valve 94 by the compression spring 99. It will further be apparent that the plug 106 may be readily removed from the remainder of the assembly to replace the flow control washer 96 and thus to regulate the rate of flow to outlet 92. The flow washer 77 is of course suitably retained in the inlet fitting 71 and is readily removable and replaceable therein to further adjust the rate of flow to the pressure chamber 80.

When the solenoid 86 is deenergized, a compression spring at the upper end of the armature 81 urges the armature 81 downwardly into seating engagement with the seat member 83 to close the passage 88. When this happens, pressure builds up in the chamber 78 to force the valve member 110 carrying the valve seat 83 downwardly to disengage the lower valve portion 110a of valve member 110 from its annular seat 112. Suitable limit projections 114 limit the downward movement of the valve member 110 to maintain armature 81 within the operative range of the coil of solenoid 86. Passages such as 116 adjacent the valve seat 112 afford communication between chamber 80 and exhaust passage 115. Thus, when the solenoid 86 is deenergized, pressure is automatically relieved from the pressure responsive output device connected with outlet passage 92 so that the output device may readily return to deactuated condition.

*Summary of the operation of the embodiment of Figures 4 and 5*

When solenoid 86 is energized, valve member 81 is retracted to the position shown in Figure 5 and spring 117 is operative to return the valve member 110 to its upper position shown in Figure 5 with the portion 110a of valve member 110 seated on the valve seat ring 112 to close off the exhaust port 115. Fluid is now delivered to the outlet 92 under the control of the metering washer 77 preferably to gradually build up pressure in an output device connected with the outlet 92. A certain portion of the fluid entering the inlet chamber 78 flows into the overflow chamber 95 under the control of the metering washer 96. Assuming the resistance of the output device increases as fluid is supplied thereto, the increasing pressure in the pressure chamber 80 eventually reaches a point where the valve member 94 is unseated to maintain the pressure in the pressure chamber 80 at a predetermined maximum value.

When the solenoid 86 is deenergized, spring means acting on the valve member 81 is effective to seat the valve member in the seat member 83, whereupon pressure builds up in the inlet chamber 78 to force the valve member 110 downwardly out of seating relation to ring 112. In this condition, fluid from the output device may flow into the pressure chamber 80 through the outlet passage 92 and then flow out the exhaust passage 115 through ports such as indicated at 116 to normally allow the output device to assume its initial condition.

Referring to Figure 6, there is illustrated an actuating assembly in accordance with the present invention including a cylinder 125 having a piston 126 movable therein with the piston rod 127 extending through an end of the cylinder for actuating any suitable output. Spring means 130 are provided for normally urging the piston 126 to retract the rod 127 into the cylinder, and valve means 131 are provided for controlling the supply of pressure to an actuating chamber 132 at one side of piston 126 to extend the rod 127 from the cylinder. As illustrated in Fig. 6, the valve means 131 is provided with an inlet fitting 133, an exhaust fitting 134 and a pressure chamber 136 communicating directly with the actuating chamber 132 of cylinder 125 through a boss 138 having apertures 139. Flow from the inlet 133 into the valve is preferably maintained at a relatively uniform rate by means of a deformable flow washer 142. A valve member 144 cooperates with a valve seat member 145 to shut off flow into the pressure chamber 136. Valve member 144 is connected with the armature of a solenoid 146 which is energizable as illustrated in Figure 6 to retract the valve member 144 against the opposition of a compression spring acting on the remote end of the valve member 144.

For determining the maximum pressure in the pressure chamber 136, a pressure regulating valve 150 controls a discharge orifice 151 and has a compression spring means 152 seated against a retainer ring 153 for urging the valve 150 into closing relation to the orifice 151. When the pressure in the pressure chamber 136 reaches a predetermined value, valve 150 is unseated against the action of spring 152, and pressure is relieved through the orifice 151 through the passage 155 and through suitable apertures in the retainer ring 153.

Upon deenergization of the solenoid 146, the compression spring means acting on the valve member 144 is operative to move the valve member 144 into closing relation to valve seat 145, whereupon pressure in inlet chamber 160 builds up to shift a valve member 161 carrying valve seat 145 against the action of a compression spring 163 to unseat valve ring 164 and exhaust fluid from the actuating chamber 132 of cylinder 125 through apertures 139, and out exhaust passage 167. It will be understood that in each of the embodiments the compression spring means acting on the valve member such as 144 maintains the valve member in closing relation to the seat member such as 145 as the valve member such as 161 shifts longitudinally to open a valve such as 164. As soon as valve 164 is open, spring 130 moves piston 126 back to the position shown as the fluid in the cylinder is discharged through passage 167.

*Summary of the operation of the embodiment of Figure 6*

Referring to Figure 6, it will be understood that when the solenoid 146 is actuated, valve member 144 is retracted from seat 145 and fluid flows into the pressure chamber 136 under the control of flow metering device 142. As pressure builds up in chamber 136, piston 126 is progressively moved to the left to extend the rod 127 from cylinder 125.

By way of example, should the rod 127 encounter sufficient resistance to build up a pressure in chamber 136 exceeding the bias on valve member 150, valve member 150 will open to relieve the excess pressure and maintain the piston rod 126 in its attained position with a constant predetermined pressure thereon until the solenoid 146 is deenergized, at which time fluid is rapidly exhausted from the cylinder 125 through apertures 139, past valve 164 and out passage 167.

Figure 7:
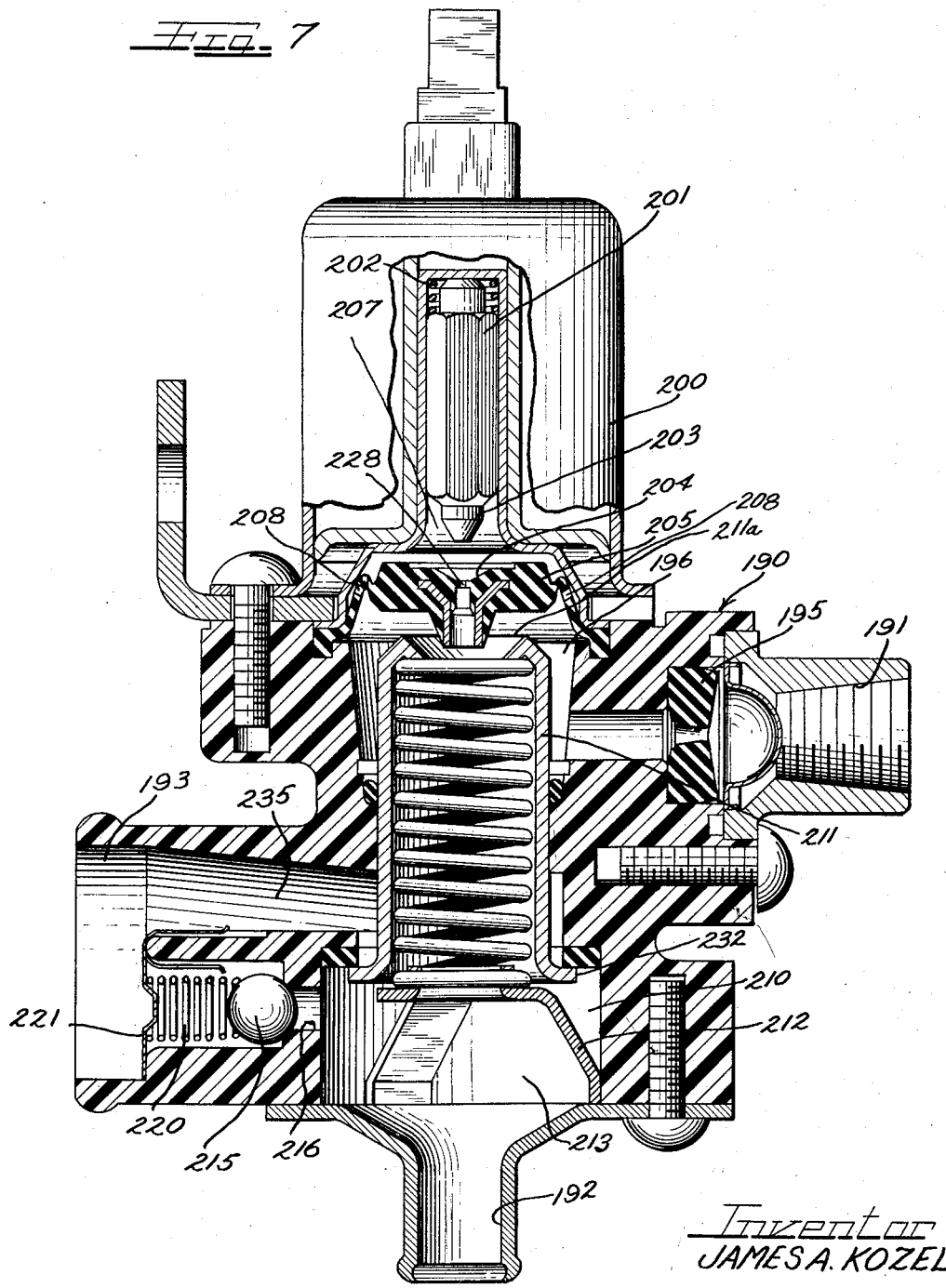
Figure 7 is a longitudinal sectional view of a still further embodiment of the present invention.

Referring to the embodiment of the invention illustrated in Figure 7, there is provided a valve housing 190 having an inlet 191, an outlet 192 and an exhaust port 193. As in the previous embodiments, a flow metering washer 195 (shown in deformed condition) is preferably provided in the inlet passage for controlling the rate of flow into inlet chamber 196. A suitable flow controlling washer is described in Dahl application Serial No. 389,210 filed October 30, 1953. When solenoid 200 is energized, armature 201 is retracted against the action of compression spring 202, and valve member 203 is removed from its seat 204 carried by a diaphragm 205. A diaphragm chamber 207 is defined on the upper side of diaphragm 205 and bleed passages such as 208 afford communication between inlet chamber 196 and diaphragm chamber 207. Fluid flows from the inlet chamber 196 to a pressure chamber 210 through the interior of valve member 211, and from the pressure chamber 210 fluid flows through ports such as 213 in spider 212 to the outlet passage 192. When the pressure in the pressure chamber 210 builds up above a predetermined point, pressure regulating valve 215 opens port 216 to maintain the pressure in the pressure chamber 210 at a predetermined maximum value.

A compression spring 220 is bottomed on means such as retaining member 221 and urges ball 215 into seating relation. By removing retaining plate 221, and replacing the spring 220 with a spring of different characteristics, the maximum pressure in the pressure chamber 210 may be varied as desired. Similarly, the rate of flow into the pressure chamber may be regulated by selection of the proper flow control washer 195. A bleed passage may be provided at the regulating valve 215, if desired.

When the solenoid 200 is deenergized, the spring 202 moves the valve 203 into closing relation to the seat 204 closing central port 228. With the center passage 228 closed, the bleed passages such as indicated at 208 through the web of the diaphragm 205 allow pressure to accumulate in the diaphragm chamber 207 sufficient to move the diaphragm 205 downwardly into closing relation to the valve seat 211a of valve member 211. When this action has been accomplished, pressure further builds up in the diaphragm chamber 207 to shift the valve member 211 downwardly and move the valve 232 out of seating relation to open up communication between the pressure chamber 210 and the discharge passage 235. The output device connected to the outlet 192 may now discharge fluid through the ports such as 213 into the pressure chamber 210 and out through the exhaust passage 235.

*Summary of the operation of the embodiment of Figure 7*

Thus in operation, when the solenoid 200 is energized, the armature 201 is retracted to open port 228. Thereupon, fluid is exhausted from the chamber 207 through the passage 228 to allow the diaphragm 205 to assume its upper position as illustrated in Figure 7. Fluid is now supplied to the outlet 192 under the control of the flow control washer 195 until the predetermined pressure is reached, at which time the valve 215 is unseated sufficiently to maintain the predetermined pressure in the chamber 210.

When the solenoid 200 is deenergized, spring 202 forces the valve member 203 downwardly into seating relation to the port 228, whereupon fluid flowing through the bleed passages 208 builds up pressure in the diaphragm chamber 207 to force the diaphragm 205 downwardly into seating relation to the valve seat 211a. This is attained due to the fact that the pressure within the chamber 196 is much greater in the annular region adjacent the periphery of the diaphragm 205 than near the center of said diaphragm. The outlet port 211a being located centrally within the chamber 196, a relatively low pressure area is created at the center of the diaphragm valve. The bleeder passageway 208 is also located toward the outer end portion of the diaphragm 205 at a region of relatively high fluid pressure rather than in a region of relatively low fluid pressure overlying the outlet port 211a. The fluid on the upper side of the diaphragm, thus exerts a greater total force on the diaphragm than the force exerted by the fluid on the underside of the diaphragm.

Therefore, when the solenoid 200 is deenergized the spring 202 forces the pilot valve member 203 downwardly into seating relation with the port 228. The fluid pressure above the diaphragm, therefore, builds up to approximately the fluid pressure below the diaphragm in the annular region outwardly of the port 211a by the bleeding of fluid under pressure through the bleed passageways 208 upon closing of the central opening 228. The total fluid force acting on the upper side of the diaphragm thus becomes greater than that acting on the underside of the diaphragm and moves the diaphragm into seating engagement with the outlet port 211a.

It will be apparent that many modifications and variations may be effected without departing from the scope of the novel concepts of the present invention.

I claim as my invention:

1. In a fluid control apparatus, a valve housing having an inlet passage, an outlet passage and an exhaust passage, a valve member having an inlet port communicating with said inlet passage, means downstream of said inlet valve port affording communication between said inlet valve port and said outlet passage, means defining an exhaust valve port for affording communication between said outlet passage and said exhaust passage, means controlled by said valve member for restricting flow through said exhaust valve port in a first position of said valve member and for affording relatively free fluid flow from said outlet passage to said exhaust passage in a second position thereof and means for regulating pressure in said outlet means and operative to afford a predetermined bleed of fluid from said outlet means to tend to control the rate of flow of fluid out of said outlet means and operative to interrupt the flow of fluid out of said outlet means when a predetermined back pressure builds up in said outlet means.

2. In a fluid control apparatus, means defining a pressure chamber, inlet means for accommodating supply of fluid to said pressure chamber, means for metering flow into said pressure chamber from said inlet means, outlet means for accommodating delivery of fluid from said pressure chamber, exhaust means for accommodating exhaust of fluid from said outlet means through said pressure chamber, flow diversion passage means communicating with said pressure chamber upstream of said outlet means for accommodating diversion of flow from said outlet means, diversion flow metering means for metering flow from said pressure chamber to said flow diversion passage means, and means responsive to pressure in said pressure chamber and operative to by-pass fluid around said diversion flow metering means when pressure in said pressure chamber exceeds a predetermined value.

3. In a fluid control apparatus, inlet means for accommodating supply of fluid therethrough, means for metering flow through said inlet means, outlet means for communication with said inlet means and for accommodating delivery of fluid from said inlet means therethrough, exhaust means for accommodating exhaust of fluid from said outlet means therethrough with fluid flowing into said outlet means and out said exhaust means, diversion passage means for communication with said inlet means upstream of said outlet means to divert flow from said outlet means, and diversion flow metering means for metering flow from said inlet means through said diversion passage means in cooperation with said first mentioned flow metering means, said diversion flow metering means being disposed in said diversion passage means.

4. In a fluid control apparatus, means defining a pressure chamber, inlet means for accommodating supply of fluid to said pressure chamber, inlet fluid metering means for metering flow into said pressure chamber from said inlet means, outlet means for accommodating delivery of fluid from said pressure chamber to an output device, exhaust means for accommodating exhaust of fluid from said output device through said outlet means and said pressure chamber, diversion passage means communicating with said pressure chamber upstream of said outlet means to divert flow from said outlet means, diversion flow metering means for metering flow from said pressure chamber to said diversion passage means, and means connected with said diversion flow metering means and responsive to pressure in said pressure chamber for shifting said diversion flow metering means to accommodate increased flow from said pressure chamber to said diversion passage means when the pressure in said pressure chamber exceeds a predetermined value.

5. In a fluid control apparatus, means defining an inlet chamber, inlet means for supplying fluid to said inlet chamber, outlet means communicating with said inlet chamber downstream thereof, exhaust means communicating with said outlet means for accommodating flow through said outlet means and out said exhaust means, a valve member for controlling flow from said outlet means to said exhaust means and having a valve port affording communication between said inlet chamber and said outlet means, a diaphragm valve having one side thereof exposed to pressure in said inlet chamber and cooperating with said valve member inlet port, means defining a diaphragm chamber on the opposite side of said diaphragm, a diaphragm port providing communication between said diaphragm chamber and said inlet chamber, and means for controlling said diaphragm port to cause the pressure in said diaphragm chamber to move said diaphragm valve into closed relation to said inlet valve port and further to shift said valve member to open said exhaust means to said outlet means for reverse flow of fluid into said outlet means and out said exhaust means.

6. In a fluid control apparatus, means defining a pressure chamber, means defining an inlet chamber upstream of said pressure chamber, inlet means for accommodating supply of fluid to said inlet chamber, outlet means communicating with said pressure chamber and accommodating discharge of fluid from said pressure chamber through said outlet means, exhaust means communicating with said pressure chamber for accommodating exhaust of fluid from said pressure chamber through said exhaust means, means responsive to pressure in said pressure chamber and operative to bleed fluid from said pressure chamber upon the pressure in said pressure chamber tending to exceed a predetermined value, valve means for restricting supply of fluid from said inlet chamber to said pressure chamber and for connecting said pressure chamber with said exhaust means, diaphragm means for actuating said valve means, and a solenoid for actuating said diaphragm means to condition said valve means for exhaust of fluid from said pressure chamber.

7. In combination with a pressure actuated device, means defining a pressure chamber, inlet means for accommodating supply of fluid to said pressure chamber, outlet means for accommodating delivery of fluid from said pressure chamber to said pressure actuated device, exhaust means for accommodating exhaust of fluid from said outlet means and from said pressure chamber, means for restricting supply of fluid to said pressure chamber from said inlet means and for affording relatively free communication of said outlet means and pressure chamber with said exhaust means to accommodate exhaust of fluid from said pressure actuated device, means for metering fluid into said pressure chamber from said inlet means at a controlled rate of flow for providing a controlled rate of movement of said pressure actuated device regardless of variations in inlet pressure, and means responsive to pressure in said pressure chamber and operative to discharge fluid from said pressure chamber to prevent the pressure in said pressure chamber from exceeding a predetermined value to control the maximum force exerted by said actuated device.

8. In a fluid control apparatus, inlet means for accommodating supply of fluid therethrough, outlet means for communication with said inlet means and for accommodating discharge of fluid therethrough, exhaust means for communication with said outlet means and for accommodating exhaust of fluid from said outlet means through said exhaust means, valve means comprising a valve body unit having a first port at one end thereof for communication with said inlet means and having a central passage extending therethrough affording communication between said inlet means and said outlet means, means defining a second valve port adjacent the opposite end of said valve body unit for affording communication between said exhaust means and said outlet means, means normally biasing said valve body unit toward a first position, means carried by said valve body unit adjacent said opposite end thereof for restricting said second port in said first position of said valve body unit, means operable to close said first port with said valve body unit still in said first position, means operably connected with said valve body unit and responsive to the increase in pressure produced by closure of said first valve port to cause said valve body unit to shift from said first position to a second position with said second port open, and means whereby fluid communication between said inlet means and said outlet means is shut-off in said second position of said valve body unit and whereby communication is established between said outlet means and said exhaust means for discharge of fluid from said outlet means to said exhaust means.

9. In a fluid control apparatus, inlet means for accommodating supply of fluid therethrough, outlet means for communication with said inlet means and for accommodating discharge of fluid therethrough, exhaust means for communication with said outlet means and for accommodating exhaust of fluid from said outlet means through said exhaust means, valve means comprising a valve body unit having a first port at one end thereof for communication with said inlet means and having a central passage extending therethrough affording communication between said inlet means and said outlet means, means defining a second valve port adjacent the opposite end of said valve body unit for affording communication between said exhaust means and said outlet means, means normally biasing said valve body unit toward a first position, means carried by said valve body unit adjacent said opposite end thereof for restricting said second port in said first position of said valve body unit, means operable to close said first port with said valve body unit still in said first position, means operably connected with said valve body unit and responsive to the increase in pressure produced by closure of said first valve port to cause said valve body unit to shift from said first position to a second position with said second port open, and a deformable flow metering washer between said inlet means and said first port for constricting the orifice therethrough with increasing pressure at said inlet means to provide a controlled rate of flow therethrough in spite of pressure fluctuations.

10. In a fluid control apparatus, inlet means for accommodating supply of fluid therethrough, outlet means for communication with said inlet means and for accommodating discharge of fluid therethrough, exhaust means for communication with said outlet means and for accommodating exhaust of fluid from said outlet means through said exhaust means, valve means comprising a valve body unit having a first port at one end thereof for communication with said inlet means and having a central passage extending therethrough affording communication between said inlet means and said outlet means, means defining a second valve port adjacent the opposite end of said valve body unit for affording communication between said exhaust means and said outlet means, means normally biasing said valve body unit toward a first position, means carried by said valve body unit adjacent said opposite end thereof for restricting said second port in said first position of said valve body unit, means operable to close said first port with said valve body unit still in said first position, means operably connected with said valve body unit and responsive to the increase in pressure produced by closure of said first valve port to cause said valve body unit to shift from said first position to a second position with said second port open, a deformable flow metering washer between said inlet means and said first port for constricting the orifice therethrough with increasing pressure at said inlet means to provide a controlled rate of flow therethrough in spite of pressure fluctuations, and a pressure regulating valve communicating with said outlet means downstream of said second port for determining the maximum force exerted on a pressure actuated device connected with said outlet means.

References Cited in the file of this patent

UNITED STATES PATENTS

| | | |
|---|---|---|
| 2,013,665 | Messier | Sept. 10, 1935 |
| 2,021,580 | Osgood | Nov. 19, 1935 |
| 2,148,703 | Martin | Feb. 28, 1939 |
| 2,548,651 | Chace | Apr. 10, 1951 |
| 2,659,385 | Hayden | Nov. 17, 1953 |
| 2,711,757 | Gardner | June 28, 1955 |
| 2,815,041 | Rimsha et al. | Dec. 3, 1957 |

FOREIGN PATENTS

| | | |
|---|---|---|
| 718,980 | Great Britain | Nov. 24, 1954 |